A. B. TODD.
SEPARATOR.
APPLICATION FILED DEC. 19, 1919.
1,348,252.
Patented Aug. 3, 1920.
2 SHEETS—SHEET 2.
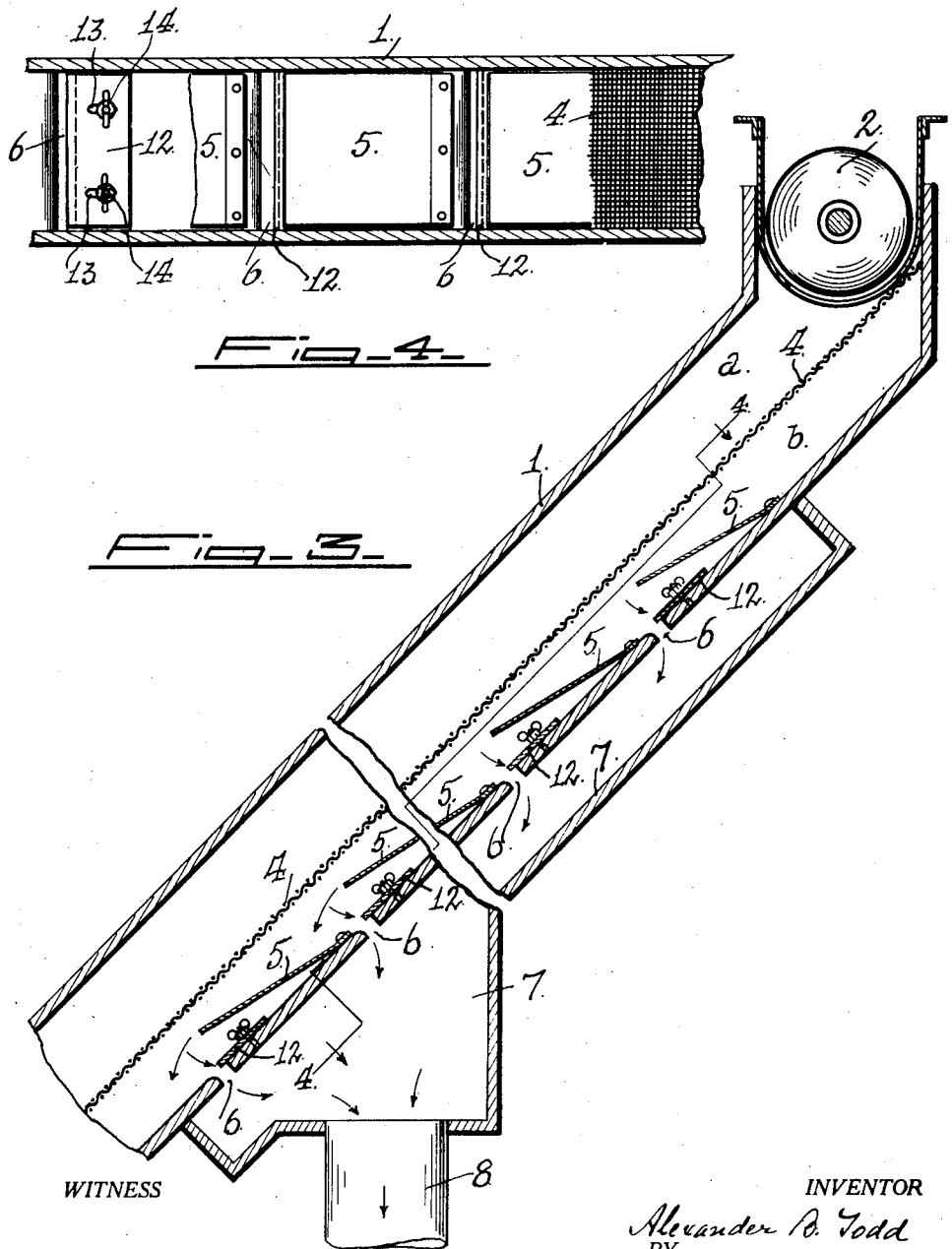
WITNESS
Wm F Drew
INVENTOR
Alexander B. Todd
BY
Booth & Booth
ATTORNEYS

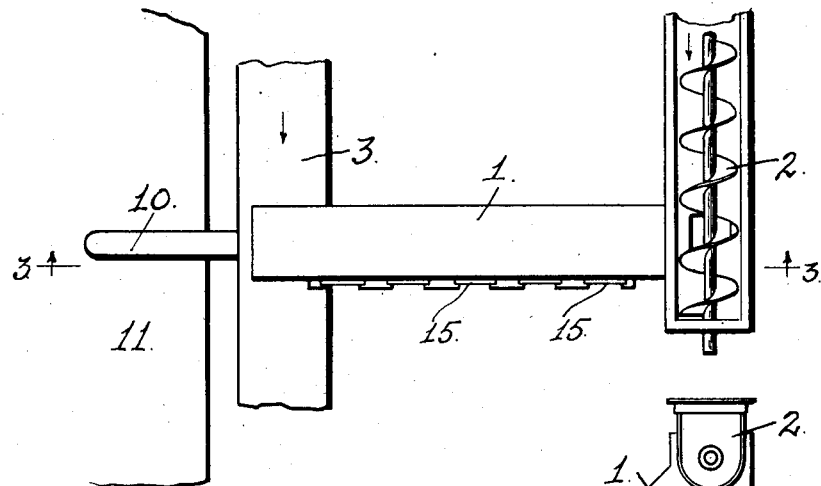
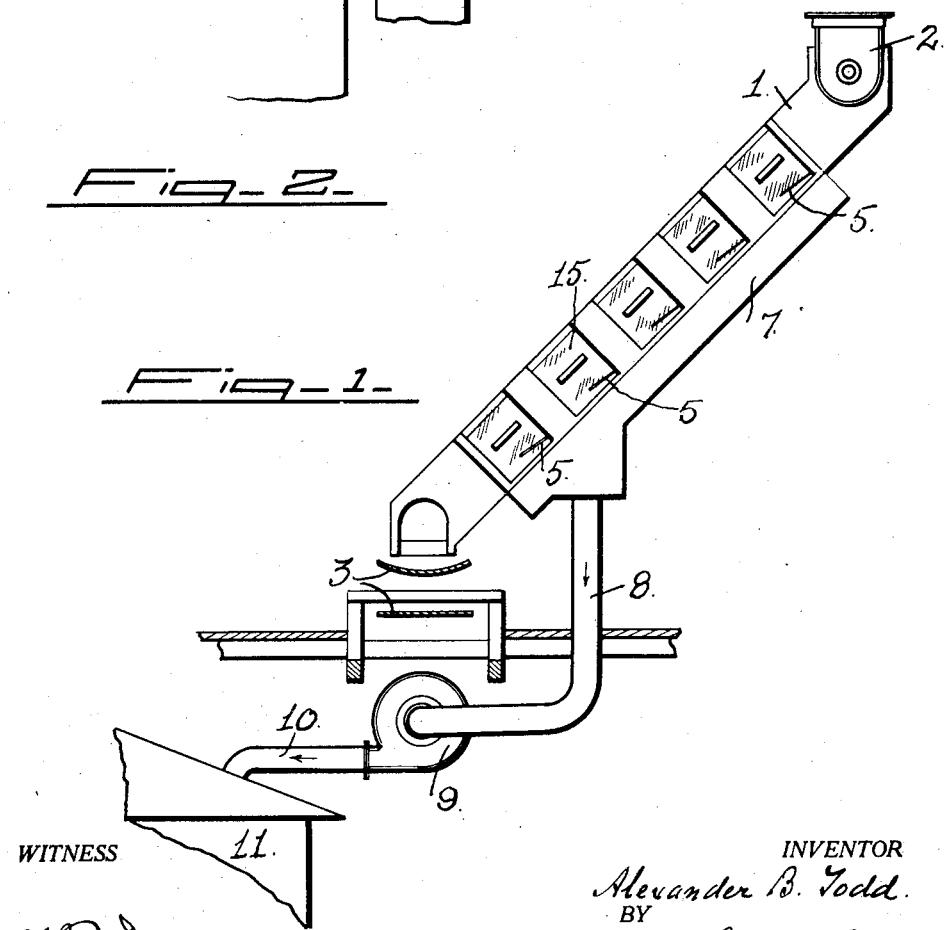

UNITED STATES PATENT OFFICE.

ALEXANDER B. TODD, OF SAN FRANCISCO, CALIFORNIA.

SEPARATOR.

1,348,252.     Specification of Letters Patent.     Patented Aug. 3, 1920.

Application filed December 19, 1919. Serial No. 346,078.

*To all whom it may concern:*

Be it known that I, ALEXANDER B. TODD, a citizen of the United States, residing at the city and county of San Francisco and State of California, have invented certain new and useful Improvements in Separators, of which the following is a specification.

My invention relates to the class of separators. It is adapted for the recovery of the relatively valuable or desirable constituents of any aggregate, where differences of specific gravity exist, but the particular art in which I find my invention especially useful is the recovery of borax particles from the tailings or refuse of the calcining process. These tailings comprise rock, shale, dirt, sand, etc., together with an appreciable quantity of borax which usually goes to waste.

It is the object of my invention in the particular use stated, to recover this borax, though as I have mentioned, my separator may also be used to recover the values from other composite materials; but for the sake of illustration I shall herein describe the device in terms of this art.

In carrying out my invention, I employ essentially the principle of separation dependent upon the difference in specific gravity between the aggregated particles, as acted upon by fluid pressure, preferably suction pressure; and to this end, my invention consists in the novel separator which I shall now fully describe, by reference to the accompanying drawings in which—

Figure 1 is a side elevation of my separator.

Fig. 2 is a plan view of same.

Fig. 3 is a sectional view of the separator box, enlarged, on the line 3—3 of Fig. 2.

Fig. 4 is a section of the box on the line 4—4 of Fig. 3.

1 is a box, pipe, tube or other form of conduit, which forms the separating chamber. This structure, which I shall herein term a box, is set at an inclination adapted to permit the material to advance by gravity. The upper end of the box is in communication with the discharge end of a screw-conveyer 2, which delivers to it the tailings or refuse from the previous calcining operation to which borax is subjected in the process of its production.

The lower end of the box lies above and is adapted to deliver the material which passes through it, to a traveling belt conveyer, indicated at 3.

Within the box 1 is a longitudinally disposed screen 4, Fig. 3, dividing the box into an upper compartment $a$ and a lower compartment $b$. The screw conveyer 2 communicates with the upper end of the upper compartment only of the box, but both compartments open out at the lower end of the box. Within the lower compartment are the baffle plates 5. These are in longitudinal series, and may be in any suitable number. Each plate rises from the floor of the box on an incline toward the foot of said box, so that the lower or free edge of each plate is elevated from the box floor.

Each plate is adapted to have its inclination varied, in order to regulate the velocity of the material stream. This may be effected in any suitable manner. A simple way, for example, is to make the plates of relatively flexible sheets, so that they may be bent about their connection with the floor of the box, to increase or decrease their angle of inclination.

In the floor of the box, below the elevated free edge of each baffle plate is made an opening 6. Under the box is a tight casing 7, which forms a suction chamber inclosing all the openings 6; and from this suction chamber leads an air pipe 8 to a suction fan 9, the latter discharging by a connection 10 into a storage bin 11.

Each opening 6 is provided with a controlling means, by which its capacity may be regulated. This may be effected by any suitable device, here shown, for example, as a damper 12 fitted to and adapted to be adjusted upon the floor of the box 1, by means of slots 13 and bolts 14, Fig. 4.

In order to conveniently reach the interior of the box, to adjust the baffle plates, and the dampers, I provide the box with side lights 15, Fig. 1, which can be opened, and which also afford a view of the interior to see how the separation is progressing.

The operation of the separator is as follows:

The tailings are delivered by the screw-conveyer 2 to the top of the inclined box 1 and are received primarily by the screen 4. The particles too large to pass through the screen, such as the larger rocks, etc., will continue on down over the screen and be delivered from the foot of the box, to the traveling belt conveyer 3, by which they will be suitably disposed of, either as waste or to be re-crushed and run over again as the case may be. The portions of the material which pass through the screen 4, and which comprise small pieces of shale, and small rocks, sand, dirt and borax particles, fall upon the inclined baffle plates 5 on the box floor. The general inclination of the box is such that these portions flow by gravity downward, but their velocity is retarded by the inclination of said plates, and at the elevated free edge of each plate they fall or drop. During this drop they come within the sphere of suction pressure from the fan 9, acting through the pipe 8, chamber 7 and openings 6, with the effect of separating out the lighter particles, which in this case are the borax constituents; these latter being drawn through the openings 6, and caused to travel through the chamber 7, pipe 8, fan 9 and connection 10, into the storage bin 11, from which they are recovered. The heavier constituents which are unaffected by the suction pressure, pass on down through the foot of the box and are delivered to the belt conveyer 3.

A proper regulation of the separation may be had by varying the inclination of the baffle plates 5, and by setting the dampers 12 to vary the capacity of the suction openings 6, thereby nicely fitting the apparatus for work upon the particular aggregate being run.

I claim:

1. A separator comprising an open ended box mounted at an inclination adapted to effect the passage therethrough of the material, by gravity, said box having in its floor, an opening; a baffle plate within said box, rising from its floor in the direction of the foot of the box, the elevated lower edge of said plate lying in substantially the plane of the opening in the box floor, to effect a drop of the material over said opening; and means for producing a suction pressure outwardly through said opening to withdraw therethrough the lighter particles from the falling aggregate.

2. A separator comprising an open ended box mounted at an inclination adapted to effect the passage therethrough of the material, by gravity, said box having in its floor an opening; a baffle plate within said box rising from the floor in the direction of the foot of the box, the elevated lower edge of said plate lying in substantially the plane of the opening in the box floor, to effect a drop of the material over said opening, and said plate being adapted to have its inclination varied as desired; and means for producing a suction pressure outwardly through said opening to withdraw therethrough the lighter particles from the falling aggregate.

3. A separator comprising an open ended box mounted at an inclination adapted to effect the passage therethrough of the material, by gravity, said box having in its floor an opening; a baffle plate within said box rising from its floor in the direction of the foot of the box, the elevated lower edge of said plate lying in substantially the plane of the opening in the box floor, to effect a drop of the material over said opening; means for varying the capacity of said opening; and means for producing a suction pressure outwardly through said opening to withdraw therethrough the lighter particles from the falling aggregate.

4. A separator comprising an open ended box mounted at an inclination adapted to effect the passage therethrough of the material, by gravity, said box having in its floor an opening; a baffle plate within said box, rising from its floor in the direction of the foot of the box, the elevated lower edge of said plate lying in substantially the plane of the opening in the box floor, to effect a drop of the material over said opening, and said plate being adapted to have its inclination varied as desired; means for varying the capacity of said opening; and means for producing a suction pressure outwardly through said opening to withdraw therethrough the lighter particles from the falling aggregate.

5. A separator comprising an open-ended box mounted at an inclination adapted to effect the passage therethrough of the material, by gravity, said box having in its floor throughout its length a plurality of spaced openings; a plurality of baffle plates within the box each rising from its floor in the direction of the foot of the box, the elevated lower edge of each plate lying in substantially the plane of a corresponding opening in the box floor to effect a drop of the material over said opening and each plate being adapted to have its inclination varied as desired; means for varying the capacity of each opening; a suction conduit underlying and inclosing the series of box-floor-openings; and a suction fan communicating with said conduit whereby the lighter particles are withdrawn through the openings and conduit, from the falling aggregate.

6. A separator comprising an open-ended box mounted at an inclination adapted to effect the passage therethrough of the material, by gravity, said box having in its floor throughout its length a plurality of spaced openings; a longitudinally disposed screen within the box, above its floor; a plurality of baffle plates within the box each rising from its floor in the direction of the foot of the box, the elevated lower edge of each plate lying in substantially the plane of a corresponding opening in the box floor to effect a drop of the material over said opening and each plate being adapted to have its inclination varied as desired; means for varying the capacity of each opening; a suction conduit underlying and inclosing the series of box-floor-openings; and a suction fan communicating with said conduit whereby the lighter particles are withdrawn through the openings and conduit, from the falling aggregate.

In testimony whereof I have signed my name to this specification in the presence of two subscribing witnesses.

ALEXANDER B. TODD.

Witnesses:
    D. S. BUSHNELL,
    R. S. PECK.